(12) United States Patent
Garcia-Cotte

(10) Patent No.: US 11,967,163 B2
(45) Date of Patent: Apr. 23, 2024

(54) METHOD FOR ASCERTAINING THE AUTHENTICITY OF A DOCUMENT AND DEVICE FOR CARRYING OUT SUCH A METHOD

(71) Applicant: CYPHEME, Paris (FR)

(72) Inventor: Hugo Garcia-Cotte, Savins (FR)

(73) Assignee: CYPHEME, Paris (FR)

( * ) Notice: Subject to any disclaimer, the term of this patent is extended or adjusted under 35 U.S.C. 154(b) by 447 days.

(21) Appl. No.: 17/289,525

(22) PCT Filed: Oct. 29, 2019

(86) PCT No.: PCT/EP2019/025369
§ 371 (c)(1),
(2) Date: Apr. 28, 2021

(87) PCT Pub. No.: WO2020/088797
PCT Pub. Date: May 7, 2020

(65) Prior Publication Data
US 2021/0397832 A1 Dec. 23, 2021

(30) Foreign Application Priority Data
Oct. 31, 2018 (FR) ...................................... 1871348

(51) Int. Cl.
*G06V 20/80* (2022.01)
*B42D 25/36* (2014.01)
(Continued)

(52) U.S. Cl.
CPC ............. *G06V 20/80* (2022.01); *B42D 25/36* (2014.10); *B42D 25/378* (2014.10); *G06V 10/56* (2022.01);
(Continued)

(58) Field of Classification Search
CPC ........ G06V 20/80; G06V 10/56; G06V 20/95; B42D 25/36; B42D 25/378; G06D 7/207;
(Continued)

(56) References Cited

U.S. PATENT DOCUMENTS

| 8,534,543 B1 * | 9/2013 | Eker | ....................... G06K 19/10 |
| | | | 235/375 |
| 2009/0167489 A1 * | 7/2009 | Nan | ....................... H04L 9/3013 |
| | | | 340/5.8 |

(Continued)

FOREIGN PATENT DOCUMENTS

| EP | 2 724 332 A1 | 4/2014 |
| GB | 2 304 077 A | 3/1997 |

(Continued)

OTHER PUBLICATIONS

International Search Report as issued in International Patent Application No. PCT/EP2019/025369, dated Feb. 11, 2020.

*Primary Examiner* — Mohamed A. Wasel
(74) *Attorney, Agent, or Firm* — Pillsbury Winthrop Shaw Pittman LLP

(57) ABSTRACT

A security element is applied to a document or an object in the form of a directly printed marking or in the form of a tag made of paper or another material, with or without an identifier. A user can take a picture of the marking or tag with a smartphone and then send the picture to a device including software provided with a recognition algorithm including neural networks. The device visualizes the fingerprint of the tag or marking, thus making it possible to ascertain the authenticity of the document or object. In order to establish the authenticity of the product protected by the device, the
(Continued)

image, stored in a cloud or blockchain database, of the tag obtained after printing same or of the marking is compared with a new description.

12 Claims, 18 Drawing Sheets

(51) Int. Cl.
*B42D 25/378* (2014.01)
*G06V 10/56* (2022.01)
*G07D 7/2033* (2016.01)
*G07D 7/207* (2016.01)
*G06V 20/00* (2022.01)
*H04L 51/02* (2022.01)
*H04M 1/72* (2021.01)

(52) U.S. Cl.
CPC .......... *G07D 7/2033* (2013.01); *G07D 7/207* (2017.05); *G06V 20/95* (2022.01); *G07D 2207/00* (2013.01); *H04L 51/02* (2013.01); *H04M 1/72* (2013.01)

(58) Field of Classification Search
CPC ............. G06D 7/2033; G07D 2207/00; G07D 7/2033; G07D 7/207; H04L 51/02; H04M 1/72
USPC ......................................................... 348/161
See application file for complete search history.

(56) References Cited

U.S. PATENT DOCUMENTS

| | | | |
|---|---|---|---|
| 2013/0022238 A1* | 1/2013 | Wood | G06K 5/00 235/494 |
| 2015/0154813 A1* | 6/2015 | Rakow | G07B 17/00435 705/50 |
| 2016/0196472 A1* | 7/2016 | Duerksen | G06V 30/224 382/145 |
| 2019/0286902 A1* | 9/2019 | Rowe | G06F 18/2451 |

FOREIGN PATENT DOCUMENTS

| | | |
|---|---|---|
| WO | WO 2012/136902 A1 | 10/2012 |
| WO | WO 2012/177845 A2 | 12/2012 |
| WO | WO 2015/052181 | 4/2015 |

\* cited by examiner

Fig 3
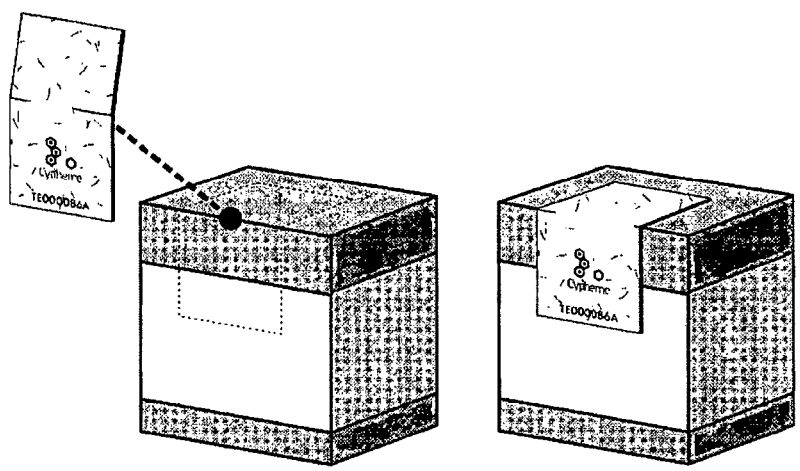
Fig 3-1
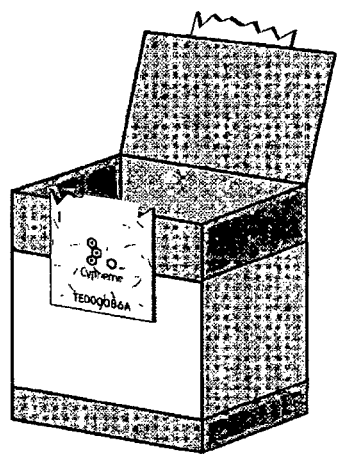
Fig 3-2
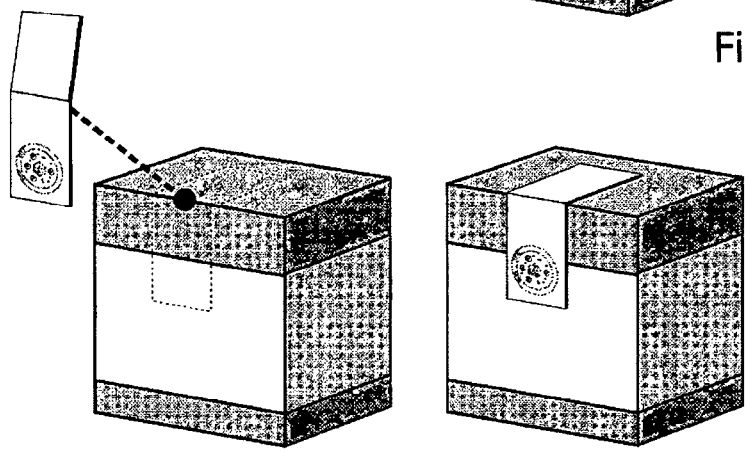
Fig 3-3

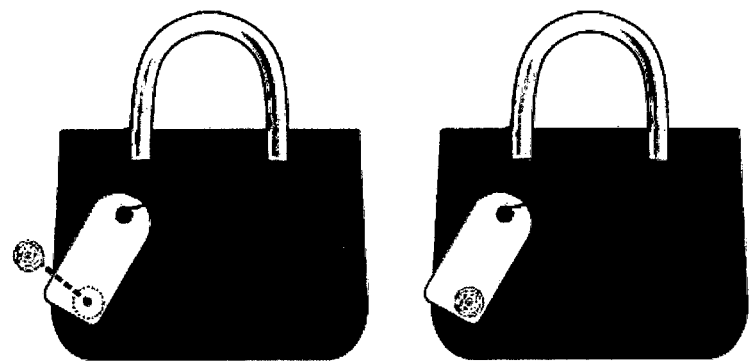
Fig 5-1
Fig 5-2
Fig 5

Fig 9
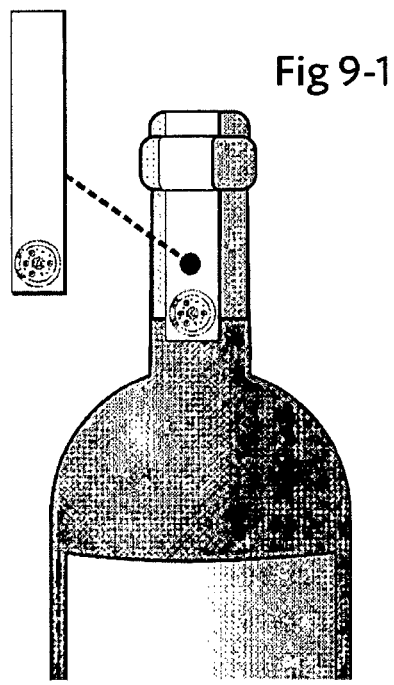
Fig 9-1
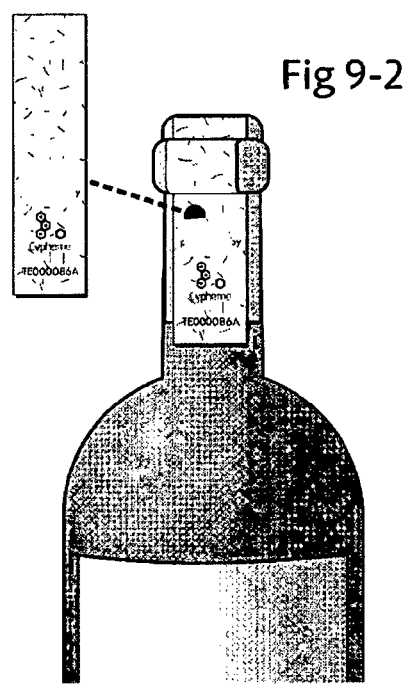
Fig 9-2

Fig 10
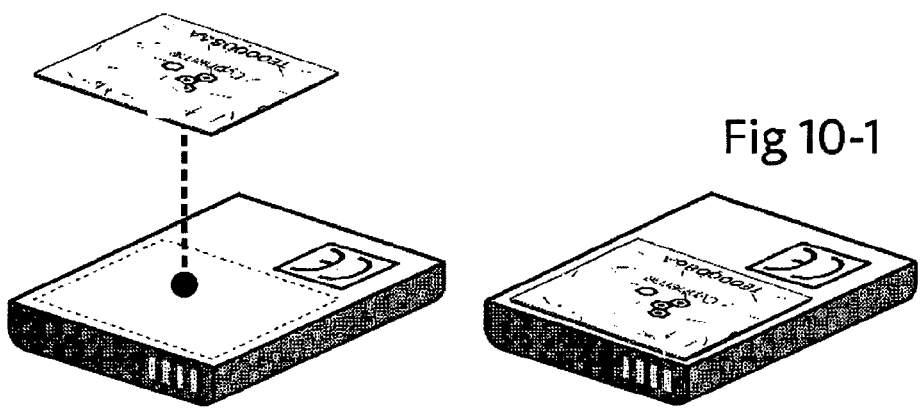
Fig 10-1
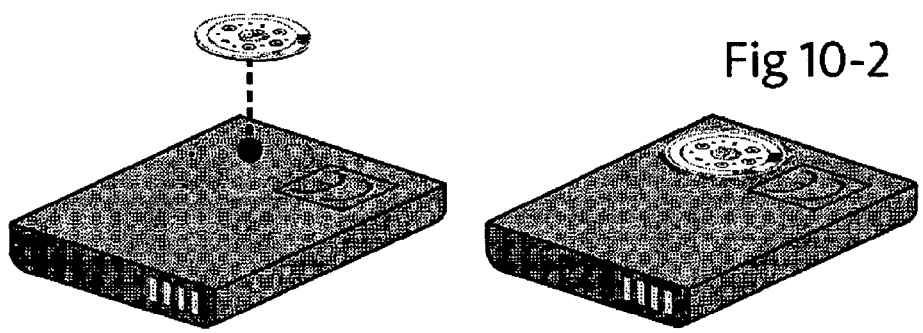
Fig 10-2

Fig 13
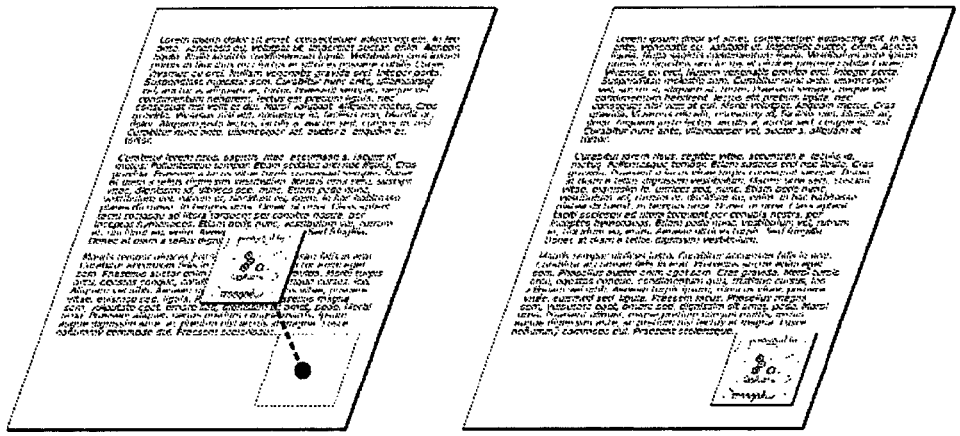
Fig 13-1
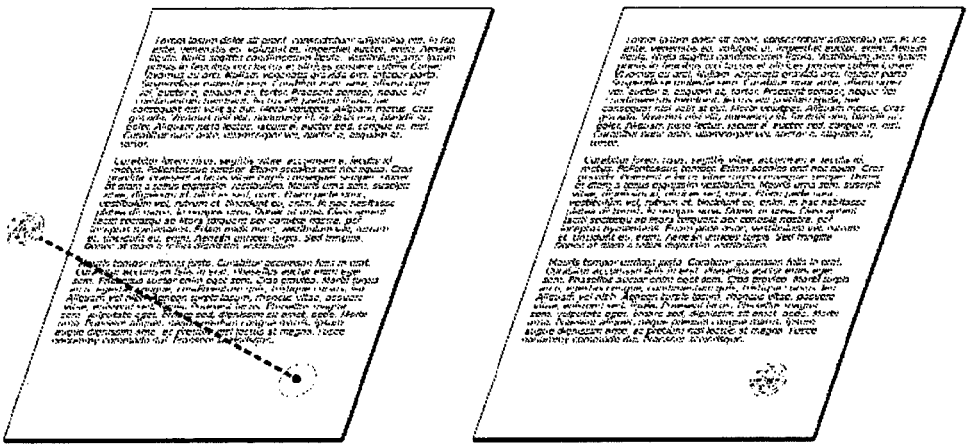
Fig 13-2

Fig 14
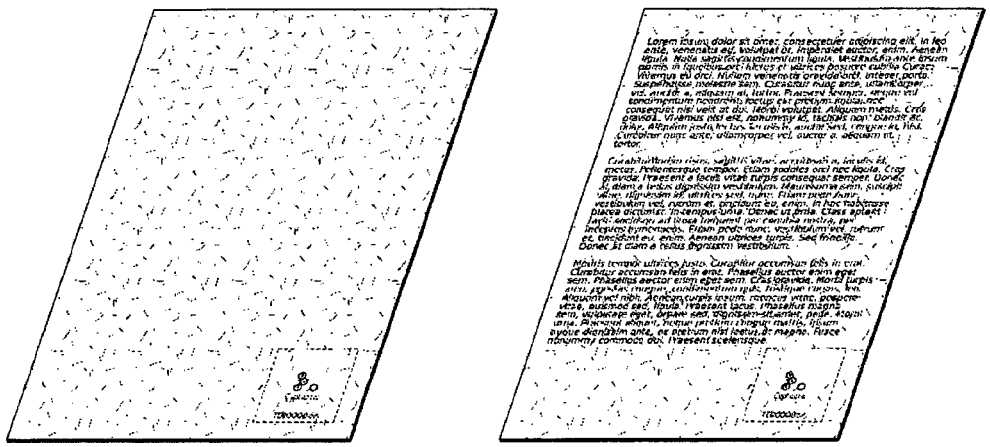
Fig 14-1
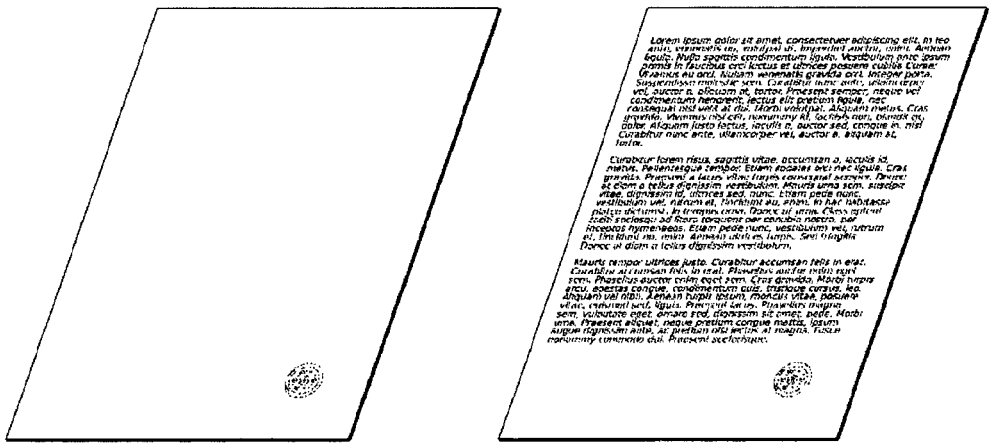
Fig 14-2

METHOD FOR ASCERTAINING THE AUTHENTICITY OF A DOCUMENT AND DEVICE FOR CARRYING OUT SUCH A METHOD

CROSS-REFERENCE TO RELATED APPLICATIONS

This application is the U.S. National Stage of PCT/EP2019/025369, filed Oct. 29, 2019, which in turn claims priority to French patent application number 1871348 filed Oct. 31, 2018. The content of these applications are incorporated herein by reference in their entireties.

TECHNICAL FIELD

A subject matter of the present invention is a security element that is more difficult to reproduce than traditional security elements and yet very simple to authenticate with a simple smartphone without any accessory, in all types of lighting conditions under different angles. It is based on the analysis of the microstructure of disruptors by an artificial intelligence. More specifically, the security element is a special marking or tag affixed on a package or a product directly, with or without an identifier (FIG. 1-3). The invention also relates to a method for ascertaining the authenticity of such an element as well as a device for carrying out such a method. The user is asked to take a picture of it, then to send it to a software which visualizes the fingerprint of the tag or the marking and can thus decide on the authenticity of the product in less than one minute. Due to the software's algorithm which comprises a recognition algorithm including neural networks ("deep learning"), the position of the random disruptors (FIG. 1-1) is read on the tag or marking and compared to the corresponding one scanned in a cloud or a blockchain. The area to be analyzed is located thanks to dots with specific features (FIG. 1-2). The invention is applicable to all products that may be counterfeited, including banknotes, identity documents, diplomas and all other documents, and thus has the effect to reinforce the fight against counterfeiting.

Until now, the analysis of the package requires the use of an infrared microscope and not any type of smartphone camera as in the present invention with easy and end-user friendly operation.

PRIOR ART

Methods used to fight against the plague of counterfeiting are known from prior art: hologram, RFID, QR Code or digital signature. A few resources are sufficient to reproduce a hologram, an RFID chip or a QR code. The present invention is impossible to reproduce: it therefore presents a higher security compared to inventions protected by previous patents.

As regards patent WO 2015052181, filed on Apr. 16, 2015 by Banque de France, it uses an interferential film that is difficult to reproduce but without creating a unique imprint for each banknote, as the film is the same for all banknotes. This solution is static.

As regards patent WO 2012/136902 filed by Mr. Franck Guigan, with a filing date on Mar. 19, 2012 and an international publication date under PCT on Oct. 11, 2012, it describes a security barcode, the marking being based on a random distribution of particles in the form of dots, of colors—inked or not—, which are optical elements disrupting light, called disruptors. To establish the authenticity of an object protected by this code, the description made after its printing, stored in a database, is compared with a new description resulting from at least two acquisitions, one under the same conditions, and the other by changing the point of view defined in three dimensions, and/or lighting. The markers can also be glitters in a varnish the tension of which is a random and irregular stain. An array of lenses above the marker allows to see them through.

The main problem is that the position from where the picture is taken is specified during the production of the device, the security being based on the 3D shape of the disruptors, the position and positions from where the picture (s) is(are) taken are important. Thus, the user must perfectly arrange their acquisition device. Which is difficult to achieve in real conditions. It is also necessary to take two picture shootings, which complicates the operation of picture shooting. The method also requires several layers of printings including a network of lenses. which complicates the production of said device and thus makes it expensive.

In this context, it has been found that, until now, authentication requires either a dedicated tool, or a complex picture shooting method with a smartphone.

OVERVIEW OF THE INVENTION

In the present invention, contrary to the technical prior art, security is perfect. The use is also very simple because it does not depend on a particular tool or a perfect picture shooting.

The present invention comprises three methods: in a first method, the fingerprint is unique with random position of colored fibers (FIG. 1-1) or any other forms of disruptors. It is not three-dimensional. A different random pattern signals the counterfeit; it is independent of the angle of the picture shootings which are made without lenses.

This authentication method thus consists in establishing a so-called subsequent description of an authentication device comprising one or more visible elements having a random shape and/or position and in comparing this description with a so-called original description of said authentication device.

The security element in the form of a tag or marking comprises simultaneously, on the one hand, a unique identifier for a product or for a set of products or printing master on a plate of a static printer of any category which can print by rotation multiple products with the same identifier, on the other hand intrinsic disruptors, in particular in special paper or plastic, arranged and randomly shaped, visible from any angle of picture shootings, e.g. the position of colored fibers in a special paper, and an algorithm which recognizes without difficulty and from any picture shooting angle, the printed pattern and its random components in an area to be analyzed and located by means of dots with geometric specific features, the recognition to the naked eye being possible but more difficult and not very reliable.

In a second method, there is an addition of a chemical product with a very specific composition, a varnish (FIG. 2-1), which replaces the fibers, which solidifies in the form of random stains in two dimensions and to which are included pigments not reproducible with a digital printer, which hinders a possible copy of the security elements. These pigments are fluorescent, with colors outside the four-color (cyan, magenta, yellow, black) spectrum (CMYK), reflective, thermochromic or color-changing. This set ensures perfection and total reliability of the print recognition.

The security element, with or without an identifier, instead of the special paper, simultaneously comprises a layer of specific chemical varnish, which solidifies and takes on, when drying, a non-reproducible random form of two-dimensional stains, and the inclusion of pigments or glitters not available in digital printers, which hinders a possible copying of the security elements, the pigments being fluorescent, with colors out of the CMYK spectrum or any other spectra available in digital printers, reflective or with changing colors, with the possibility of an additional printing requiring or not the use of a second machine and thus subject to a random register error, the whole ensuring the perfection of the recognition of the unique printing.

In a third method, instead of the special paper or the randomly shaped varnish, an ink or paint with a static or variable form is added including pigments or glitters, which hinders a possible copy of the security element, the pigments being fluorescent, with colors outside the CMYK spectrum or outside the pantone spectrum, reflective, changing and/or resulting from a complex mixture of colors, all of which ensures the perfection of the recognition of the ink or the paint.

By use of the device of the invention, the first method using in particular a special paper or plastic and all categories of printers, the second method using a special ink and offset, flexo or rotogravure printers, the user is led to take one or several pictures with a smartphone, with or without flash, then to send it to an algorithmic device, including a software which visualizes the unique fingerprint of the special paper or varnish, as well as the pigments or glitters not available in the fingerprints, allowing to ascertain the authenticity of said security element by comparing it almost instantaneously with the original description stored in a cloud or blockchain, wherein said software has either a direct connection to the cloud or to the blockchain, or a connection via a "chat box" messaging service dedicated to the cloud or to the blockchain.

The present invention thus makes it possible to verify the authenticity of a document or a product in an almost instantaneous and very precise manner. The security is maximum, the production method is inexpensive and the authentication is simple.

With the third method, the user is led to take one or more photographs with a smartphone, with or without flash, and then to send it to a device comprising a software that visualizes the colors and determines, in particular through neural networks, whether these colors correspond to the ink or paint of the original description, stored in a smartphone or in a cloud, wherein said software has either a direct connection to the cloud or to the blockchain, or a "chatbot" messaging service connection dedicated to the cloud or the blockchain.

DESCRIPTION OF THE DRAWINGS

Legend
FIGS. 3-1 & 3-2: Paper sticker that seals a box
FIG. 3-3: Varnish sticker that seals a box
FIG. 5: Varnished or paper sticker added on a handbag tag
FIG. 9: Varnish or paper sticker on a wine bottle
FIG. 10: Varnish or paper sticker on a product (phone battery)
FIG. 13: Varnish or paper sticker on a document
FIG. 14: Document incorporating the paper or varnish technology
FIG. 15-1: Special ink, static form, color outside the Pantone spectrum
FIG. 15-2: Unique or static identifier, normal ink
FIG. 15-3: Positioning marker, normal ink

Figure 1:
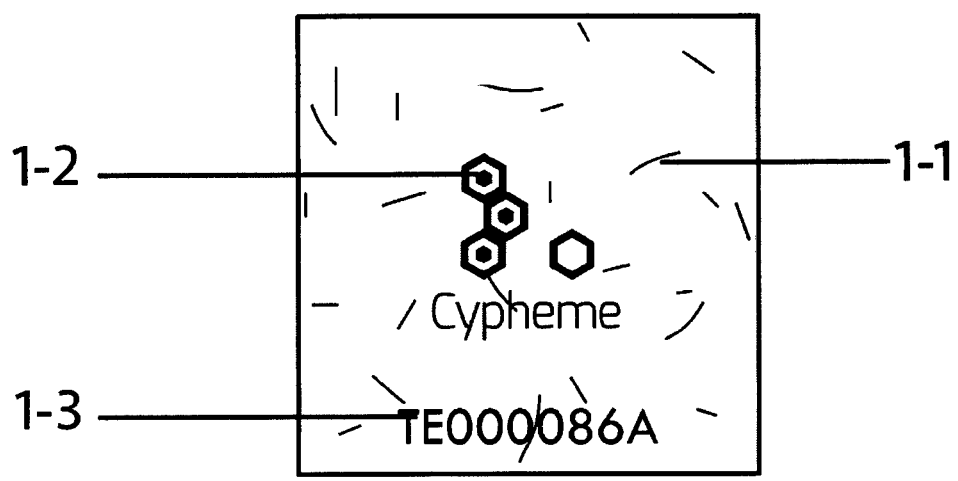
FIG. 1:
1-1: Color fibers with random position (random disruptors)
1-2: Positioning markers (dots with geometric specific features)
1-3: Unique identifier
Legend
Figure 2:
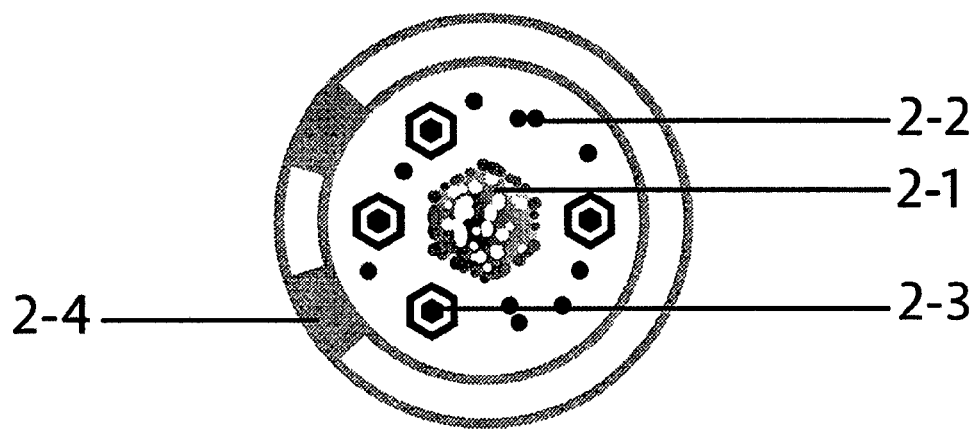
FIG. 2:
2-1: Special varnish, random shape
2-2: Unique identifier
2-3: Positioning marker
2-4: Additional printing
The diagrams represent use cases
Figure 4:
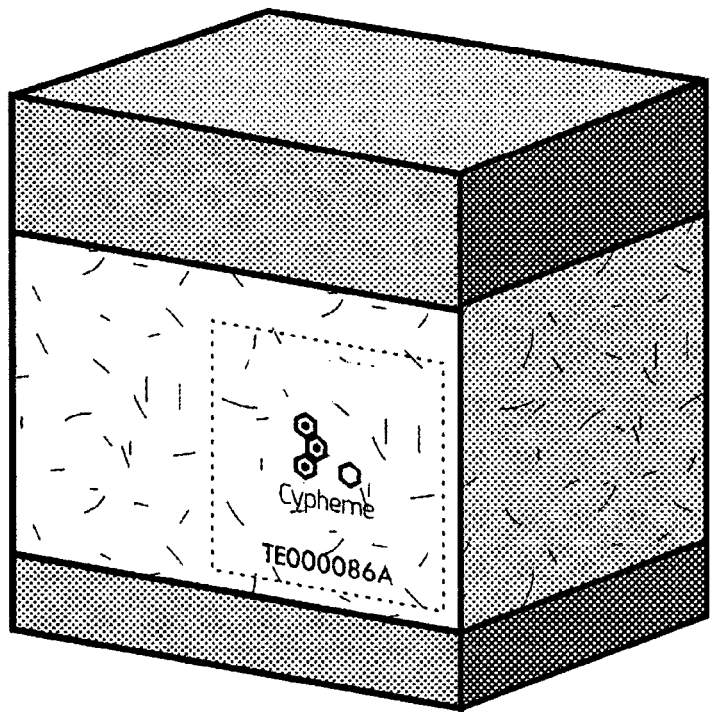
FIG. 4: Cardboard packaging incorporating the technology
Figure 6:
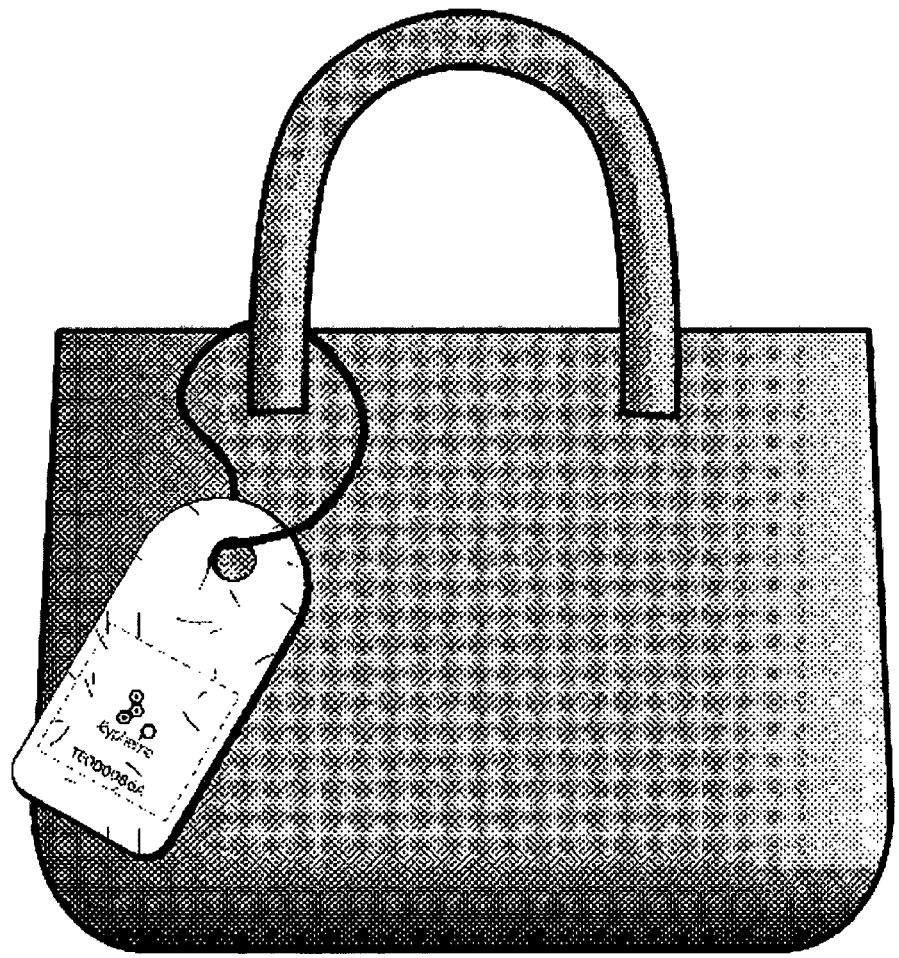
FIG. 6: Bag tag incorporating paper technology
Figure 7:
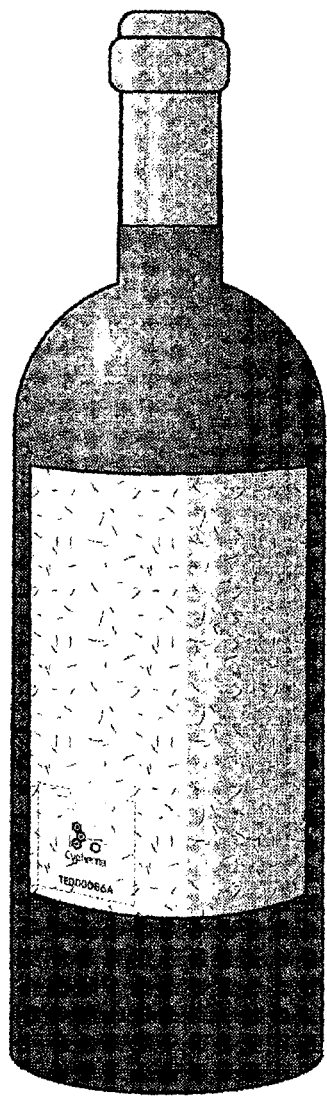
FIG. 7: Wine label incorporating paper technology
Figure 8:
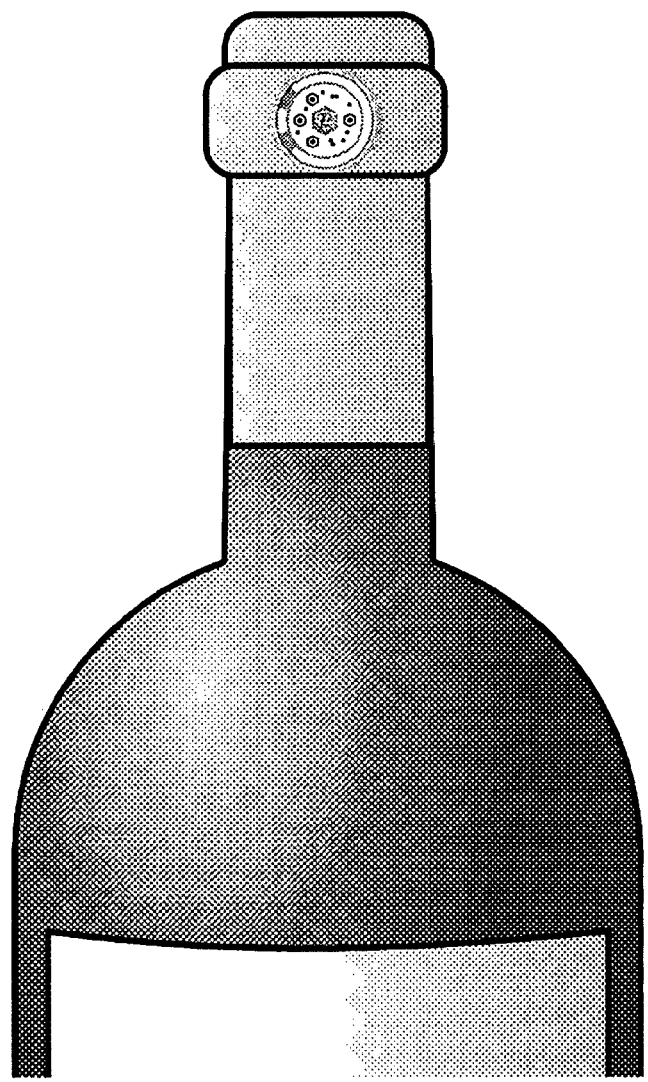
FIG. 8: Wine bottle cap incorporating varnish technology
Figure 11:
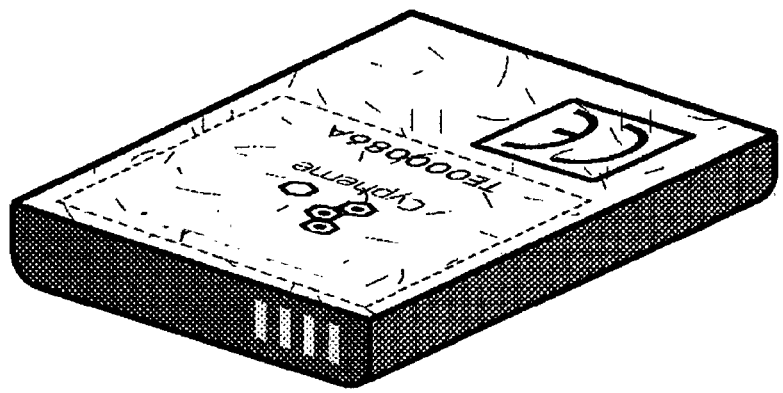
FIG. 11: Product incorporating paper technology
Figure 12:
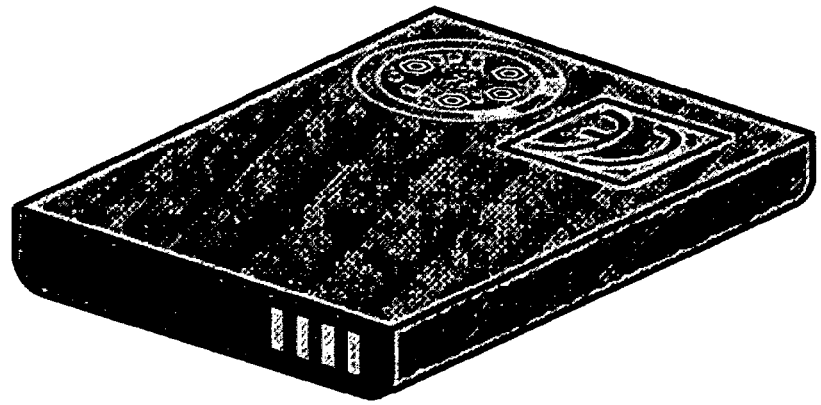
FIG. 12: Product incorporating varnish technology
Figure 15:
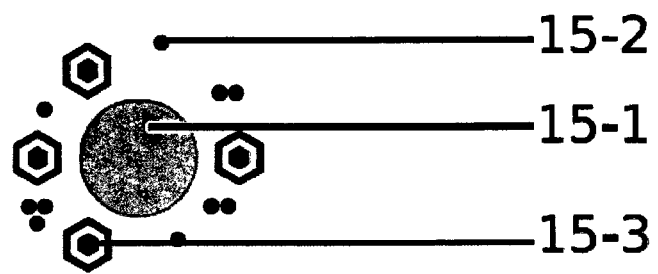
Figure 16:
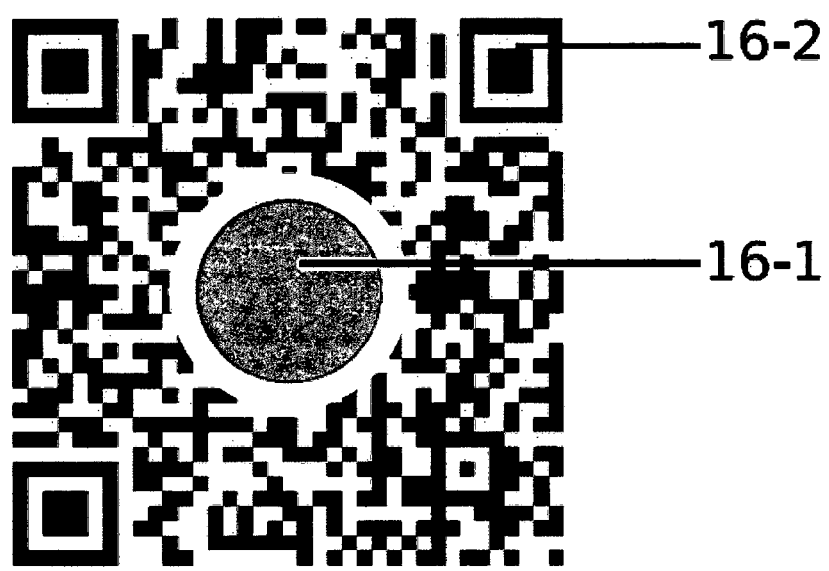
FIG. 16: Static or variable QR code with in addition a static part in color ink outside the Pantone spectrum
Figure 17:
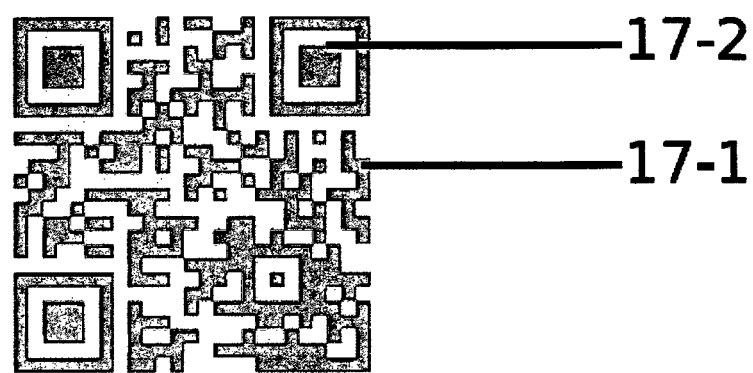
FIG. 17: Static or variable QR code printed with one or more colors of a special ink out of the Pantone spectrum
Figure 18:
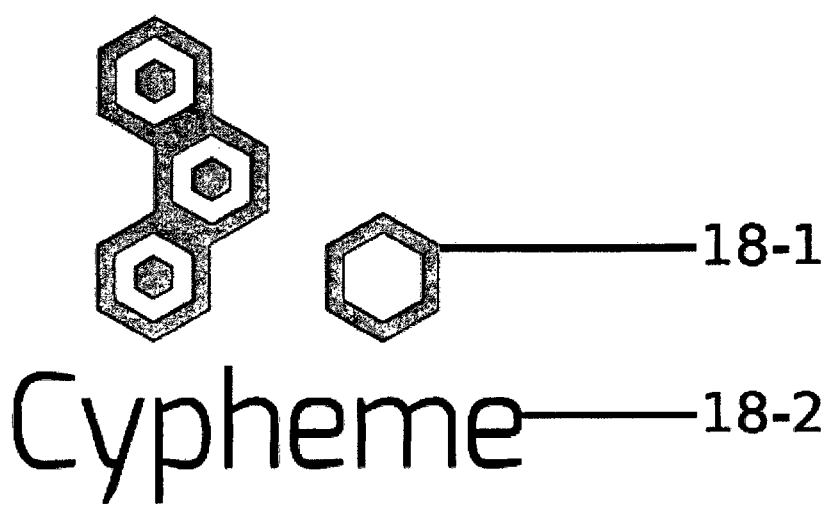
FIG. 18: Logo partially printed with a normal ink and partially with a special ink out of the Pantone spectrum

The invention claimed is:

1. An authentication method comprising establishing a subsequent description of an authentication device comprising one or more visible elements having a random shape and/or position and comparing said description with an original description of said authentication device,
   wherein the authentication device includes a security element in the form of a tag or marking simultaneously comprising,
   a unique identifier either for a product or for a set of products or for identifying a printing master on a plate of a static printer of any category that can print by rotation multiple products with the same identifier, and
   intrinsic disruptors randomly arranged and with random forms, in two dimensions so as to be visible whatever an angle of picture shootings, wherein the intrinsic disruptors are colored fibers at bidimensional positions in a special paper or plastic, or the intrinsic disruptors are a non-reproducible random shape of two-dimensional stains presented by solidified and dried specific chemical varnish, and
   positioning markers which consist of a plurality of dots with geometric specific features for localizing an area, which includes the intrinsic disruptors, to be analyzed for authentication,
   and the method further comprises recognizing by an algorithm, from any picture shooting angle, the bidimensional printed pattern and its random components in said area including the intrinsic disruptors to be analyzed and localized thanks to said dots with geometric specific features.

2. The authentication method as claimed in claim 1, wherein the intrinsic disruptors are the non-reproducible random shape of two-dimensional stains presented by solidified and dried specific chemical varnish; and further comprising additional printing of the two-dimensional stains using or not using of a second machine and thus the two-dimensional stains being subjected to a random register error, the whole ensuring a recognition of the unique printing.

3. An authentication device for implementing the authentication method as claimed in claim 1, the authentication device comprising
    a camera to take one or more pictures of the security element, with or without flash, and
    a device configured to receive the one or more pictures and comprising a recognition algorithm software that visualizes a unique fingerprint of the special paper, or plastic or varnish, allowing the authenticity of said security element to be ascertained by comparing it almost instantaneously with the original description stored in a cloud, wherein said recognition algorithm software has either a direct connection to the cloud or a blockchain, or a connection via a chat box messaging service dedicated to the cloud or blockchain;
    wherein the at least one security element is in the form of a tag or marking and simultaneously comprises:
        a unique identifier for a product or for a set of products or for identifying printing master on a plate of a static printer of any category that can print by rotation multiple products with the same identifier, and
        intrinsic disruptors randomly arranged and with random forms in two dimensions so as to be visible whatever an angle of picture shootings, wherein the intrinsic disruptors are colored fibers at bidimensional positions in a special paper or plastic, or the intrinsic disruptors are non-reproducible random shape of two-dimensional stains presented by solidified and dried specific chemical varnish, and
        positioning markers which consist of a plurality of dots with geometric specific features for localizing an area, which includes the intrinsic disruptors, to be analyzed for authentication.

4. The authentication method as claimed in claim 1, wherein the authentication device includes a security element, with or without an identifier, instead of a special paper or a randomly shaped varnish, the security element including a static or variable shape ink or paint, pigments of the ink or paint being fluorescent, with colors outside the four-color CMYK spectrum or outside the pantone spectrum, reflective, changing and/or resulting from a complex mixture of colors, the whole ensuring the perfection of the recognition of the ink or the paint.

5. An authentication device for implementing the authentication method as claimed in claim 4, the authentication device comprising
    a camera to take one or more pictures of the security element, with or without flash, and
    a device configured to receive the one or more pictures and comprising a recognition algorithm software that visualizes the colors of the ink or paint and determines whether these colors correspond to the ink or paint of the original description, stored in a smartphone or in a cloud, wherein said software has either a direct connection to the cloud or to a blockchain, or a connection via a chatbot messaging service dedicated to the cloud or blockchain;
    wherein the at least one security element is in the form of a tag or marking and simultaneously comprises:
        a unique identifier for a product or for a set of products or for identifying printing master on a plate of a static printer of any category that can print by rotation multiple products with the same identifier,
        intrinsic disruptors randomly arranged and with random forms in two dimensions so as to be visible whatever an angle of picture shootings, wherein the intrinsic disruptors are colored fibers at bidimensional positions in a special paper or plastic, or the intrinsic disruptors are non-reproducible random shape of two-dimensional stains presented by solidified and dried specific chemical varnish, and
        positioning markers which consist of a plurality of dots with geometric specific features for localizing an area, which includes the intrinsic disruptors, to be analyzed for authentication.

6. The authentication method as claimed in claim 2, wherein the at least one security element further includes a static or variable shape ink or paint, pigments of the ink or paint being fluorescent, with colors outside the four-color CMYK spectrum or outside the pantone spectrum, reflective, changing and/or resulting from a complex mixture of colors, the whole ensuring the perfection of the recognition of the ink or the paint.

7. The authentication method as claimed in claim 1, wherein the intrinsic disruptors include a position of colored fibers in a special paper.

8. The authentication device as claimed in claim 3, wherein the camera is a camera of a smartphone.

9. An authentication device for implementing the authentication method as claimed in claim 2, the authentication device comprising;
    a camera to take one or more pictures of the security element, with or without flash, and
    a device configured to receive the one or more pictures and comprising a recognition algorithm software that visualizes a unique fingerprint of the varnish, allowing the authenticity of said at least one security element to be ascertained by comparing it almost instantaneously with the original description stored in a cloud, wherein said recognition algorithm software has either a direct connection to the cloud or a blockchain, or a connection via a chat box messaging service dedicated to the cloud or blockchain;
    wherein the at least one security element is in the form of a tag or marking and simultaneously comprises:
        a unique identifier for a product or for a set of products or for identifying printing master on a plate of a static printer of any category that can print by rotation multiple products with the same identifier,
        intrinsic disruptors randomly arranged and with random forms in two dimension so as to be visible whatever an angle of picture shootings, and
        positioning markers which consist of a plurality of dots with geometric specific features for localizing an area, which includes the intrinsic disruptors, to be analyzed for authentication.

10. The authentication device as claimed in claim 9, wherein the camera is a camera of a smartphone.

11. The authentication device as claimed in claim 5, wherein the recognition algorithm software determines whether these colors correspond to the ink or paint of the original description using a neural network.

12. The authentication device as claimed in claim 5, wherein the camera is a camera of a smartphone.

* * * * *